(12) United States Patent
Pallack

(10) Patent No.: US 7,958,667 B1
(45) Date of Patent: Jun. 14, 2011

(54) BAIT WELL APPARATUS

(76) Inventor: Bryan D. Pallack, Port St Lucie, FL (US)

( * ) Notice: Subject to any disclaimer, the term of this patent is extended or adjusted under 35 U.S.C. 154(b) by 280 days.

(21) Appl. No.: 12/397,159

(22) Filed: Mar. 3, 2009

(51) Int. Cl.
*A01K 97/04* (2006.01)
(52) U.S. Cl. ............... 43/57; 43/54.1; 43/55; 43/56
(58) Field of Classification Search .............. 43/54.1, 43/55–57
See application file for complete search history.

(56) References Cited

U.S. PATENT DOCUMENTS

| | | | |
|---|---|---|---|
| 3,886,679 A | | 6/1975 | Marcell |
| 4,054,005 A | * | 10/1977 | Lightfoot ............... 43/55 |
| 4,615,137 A | * | 10/1986 | Radmanovich ........... 43/57 |
| 4,757,636 A | | 7/1988 | Lambourn |
| 5,077,932 A | * | 1/1992 | Hetherington ........... 43/57 |
| 5,267,410 A | * | 12/1993 | Peyatt ................... 43/57 |
| 5,305,542 A | | 4/1994 | Phelps |
| 5,634,291 A | | 6/1997 | Pham |
| D389,553 S | | 1/1998 | Muto |
| 5,799,435 A | | 9/1998 | Stafford |
| 6,886,291 B1 | * | 5/2005 | Jaggers ............... 43/56 |
| 7,140,600 B1 | * | 11/2006 | Wry ................. 261/121.2 |
| 7,644,535 B2 | * | 1/2010 | Sloop ................... 43/56 |
| 2008/0028667 A1 | * | 2/2008 | Grzybowski ............ 43/57 |

* cited by examiner

*Primary Examiner* — David J Parsley
*Assistant Examiner* — Danielle Clerkley
(74) *Attorney, Agent, or Firm* — Crossley Patent Law; Mark A. Crossley

(57) ABSTRACT

The bait well apparatus provides for hands-free carry of live bait within an ergonomically shaped apparatus. The concave inner surface fits against a user's hip or leg or even waist, depending upon the chosen wear location. A belt is provided that fits a user's waist or hips. A small optional belt is provided that fits a user's leg. The two clips disposed on the concave inner surface are selectively hooked over a given belt or other clothing item. The lid is hinged to open over the well within the body of the apparatus. The apparatus is provided in more than one size. One size, for example, holds 48 ounces of water. Another exemplary size holds up to 64 ounces of water.

6 Claims, 4 Drawing Sheets

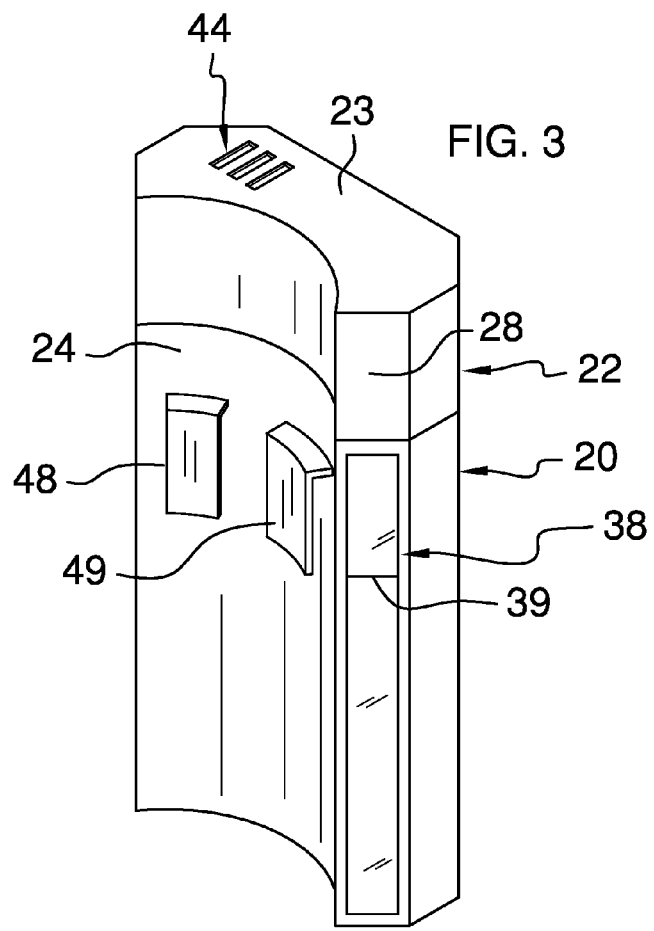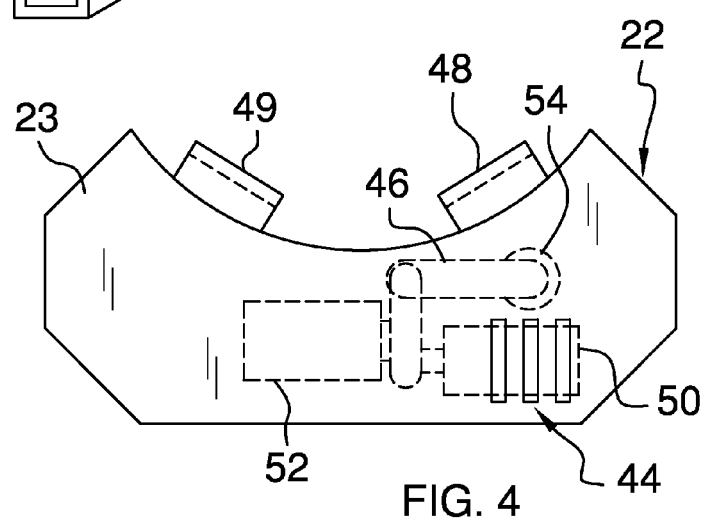

BAIT WELL APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Fishermen/women who use live bait are saddled with the chore of transporting a live bait well, or constantly returning to the bait well for additional bait. Trying to carry fishing poles, tackle boxes, and a live bait well is neither convenient nor even always possible. Remote, hard to access areas often negate live bait carry, as a user may find hands and feet fully occupied in accessing a given area. Spilling a live bait well is also often a result. What has been needed is a live bait well which is carried hands free, without hampering a user, and provides aeration to the live bait in order to keep the bait healthy and vibrant. The present apparatus provides just such a solution.

FIELD OF THE INVENTION

The bait well apparatus relates to bait wells and buckets and more especially to a hands-free transportable bait well apparatus that includes aeration.

SUMMARY OF THE INVENTION

The general purpose of the bait well apparatus, described subsequently in greater detail, is to provide a bait well apparatus which has many novel features that result in an improved bait well apparatus which is not anticipated, rendered obvious, suggested, or even implied by prior art, either alone or in combination thereof.

To attain this, the bait well apparatus provides for hands-free carry of live bait within an ergonomically shaped apparatus. The concave inner surface fits against a user's hip or leg or even waist, depending upon the chosen wear location. A belt is provided that fits a user's waist or hips. A small optional belt is provided that fits a user's leg. The two clips disposed on the concave inner surface are selectively hooked over a given belt or other clothing item. The apparatus is available with the junctions of the various outer surfaces in distinctly abrupt junctures or in smoother, more rounded junctures. The lid is hinged to open over the well within the body of the apparatus. The apparatus is provided in more than one size. One size, for example, holds 48 ounces of water. Another exemplary size holds up to 64 ounces of water.

Thus has been broadly outlined the more important features of the improved bait well apparatus so that the detailed description thereof that follows may be better understood and in order that the present contribution to the art may be better appreciated.

An object of the bait well apparatus is to hold and preserve live bait.

Another object of the bait well apparatus is to provide for hands-free carry of live bait.

A further object of the bait well apparatus is to fit comfortably against a person's hip, waist or leg.

Still another object of the bait well apparatus is to save time in procuring bait while fishing.

An added object of the bait well apparatus is to be compact.

And, an object of the bait well apparatus is to seal against leakage.

These together with additional objects, features and advantages of the improved bait well apparatus will be readily apparent to those of ordinary skill in the art upon reading the following detailed description of presently preferred, but nonetheless illustrative, embodiments of the improved bait well apparatus when taken in conjunction with the accompanying drawings.

In this respect, before explaining the current embodiments of the improved bait well apparatus in detail, it is to be understood that the bait well apparatus is not limited in its application to the details of construction and arrangements of the components set forth in the following description or illustration.

Those skilled in the art will appreciate that the concept of this disclosure may be readily utilized as a basis for the design of other structures, methods, and systems for carrying out the several purposes of the improved bait well apparatus. It is therefore important that the claims be regarded as including such equivalent constructions insofar as they do not depart from the spirit and scope of the bait well apparatus. It is also to be understood that the phraseology and terminology employed herein are for purposes of description and should not be regarded as limiting.

BRIEF DESCRIPTION OF THE DRAWINGS

FIG. 3 is an inner perspective view.
FIG. 4 is a top plan view.

DETAILED DESCRIPTION OF THE DRAWINGS

With reference now to the drawings, and in particular FIGS. 1 through 6 thereof, the principles and concepts of the bait well apparatus generally designated by the reference number 10 will be described.

Figure 1:
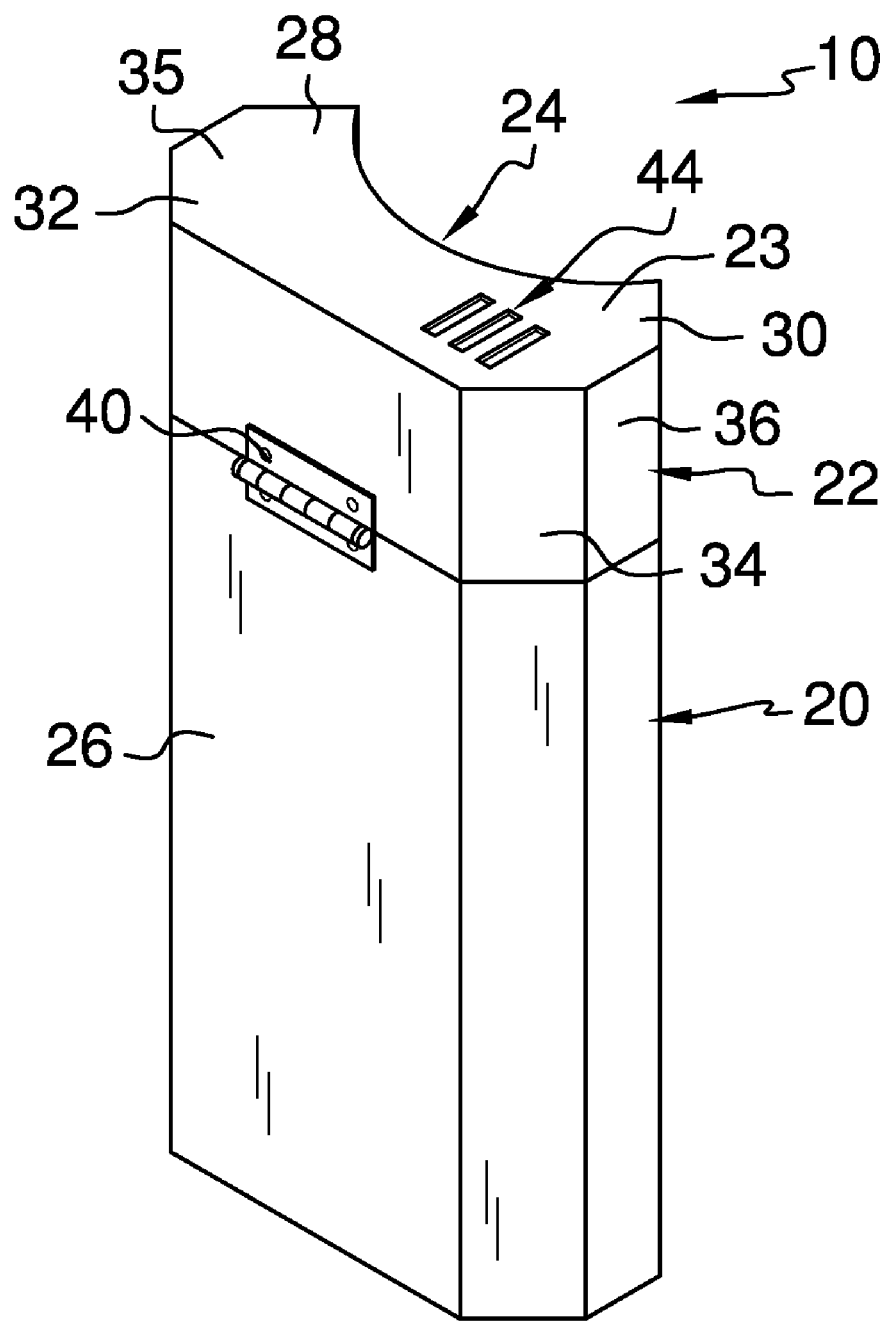
FIG. 1 is an outer perspective view.

Referring to FIGS. 1 and 3, the live bait well apparatus 10 partially comprises a body 20 hingedly affixed to a lid 22 via the hinge 40. The hinge 40 is disposed on the flat outer surface 26. The body 20 and lid 22 have a concave inner surface 24 spaced apart from a flat outer surface 26. The pair of spaced apart sides comprises the first side 35 spaced apart from the second side 36. The sides are perpendicular to the flat outer surface 26. The pair of spaced apart outer angles joins the flat outer surface 26 to the pair of sides. The outer angles comprise the first outer angle 32 and the second outer angle 34. The pair of spaced apart inner angles comprises the first inner angle 28 and the second inner angle 30. The inner angles join the sides to the concave inner surface 24. The pair of spaced apart clips is affixed to the body 20 concave inner surface 24. The clips comprise the first clip 48 and the second clip 49. The clips are selectively disposed over a belt or other clothing item. The well 21 is disposed within the body 20. The vent 44 is disposed within the lid top 23. The window 38 is disposed the body first inner angle 28. Optionally, a window 38 is disposed within both inner angles. A fill line 39 is disposed on each window 38 to guide a user in properly filling the well 21.

Figure 2:
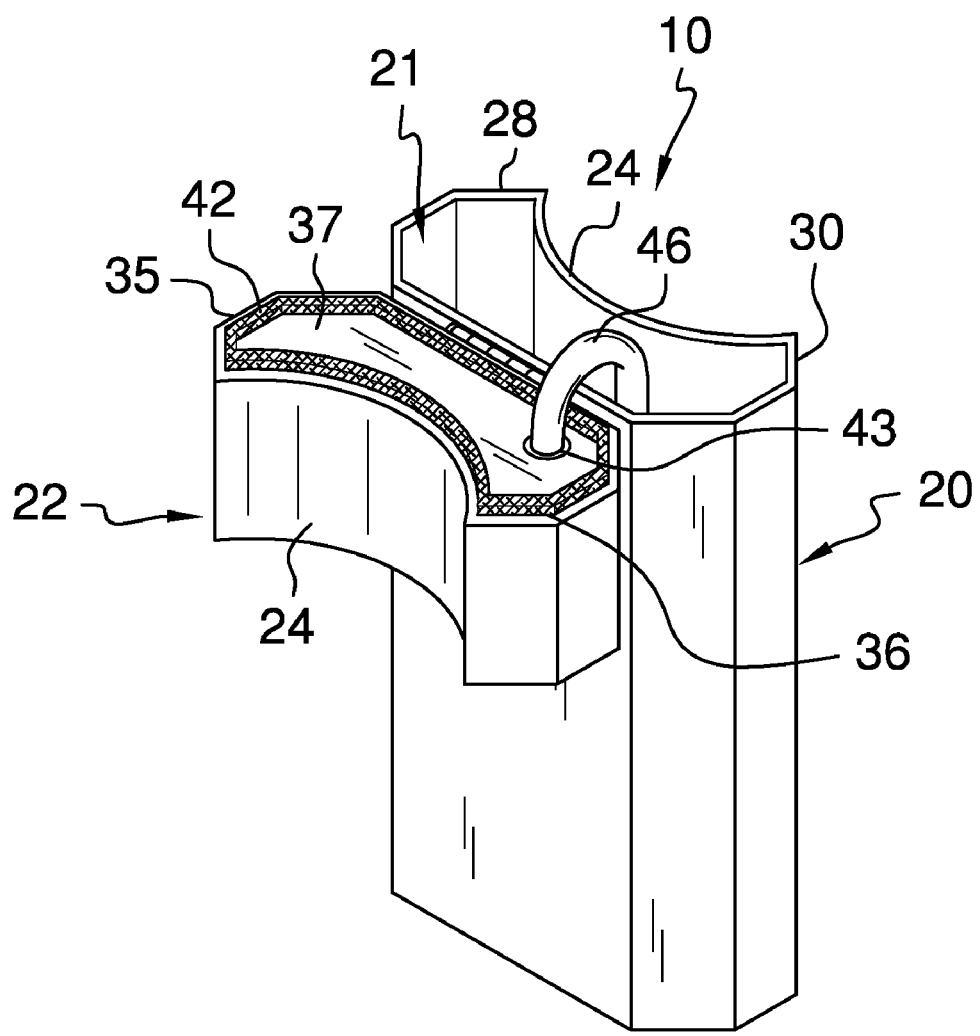
FIG. 2 is an outer perspective view with lid open.
Figure 6:
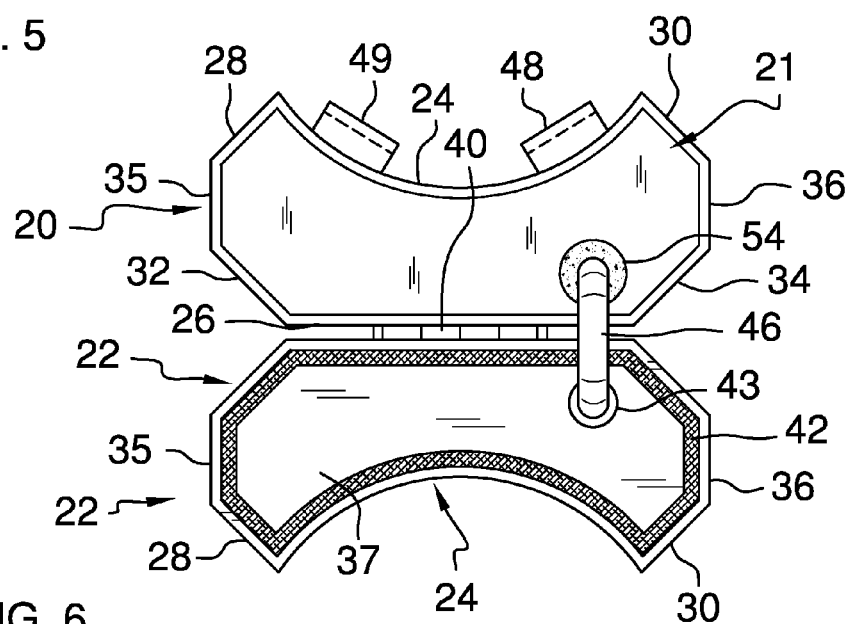
FIG. 6 is a top plan view, lid open.

Referring to FIGS. 2 and 6, the removable lid bottom 37 has a gasket 42 sealing the lid bottom 37 to the lid 22. The gasket 42 is disposed around the interior perimeter of the lid 22 and further selectively seals the lid 22 to the body 20.

Referring to FIG. 4, the electric motor 52 is disposed within the lid 22. The pump 50 is joined to the electric motor 52. The pump 50 is in communication with the vent 44 in the lid top 23. A battery power source (not shown) is disposed within the lid 22. The power source is in communication with the pump 50.

The flexible hose 46 is extended from the pump 50 out of the lid bottom 37 and into the well 21. The flexible hose 46 is sealed in the lid bottom 37 by the seal 43. The flexible hose 46 allows the lid 22 to freely open. The porous air stone 54 is affixed to the lower end of the flexible hose 46.

Figure 5:
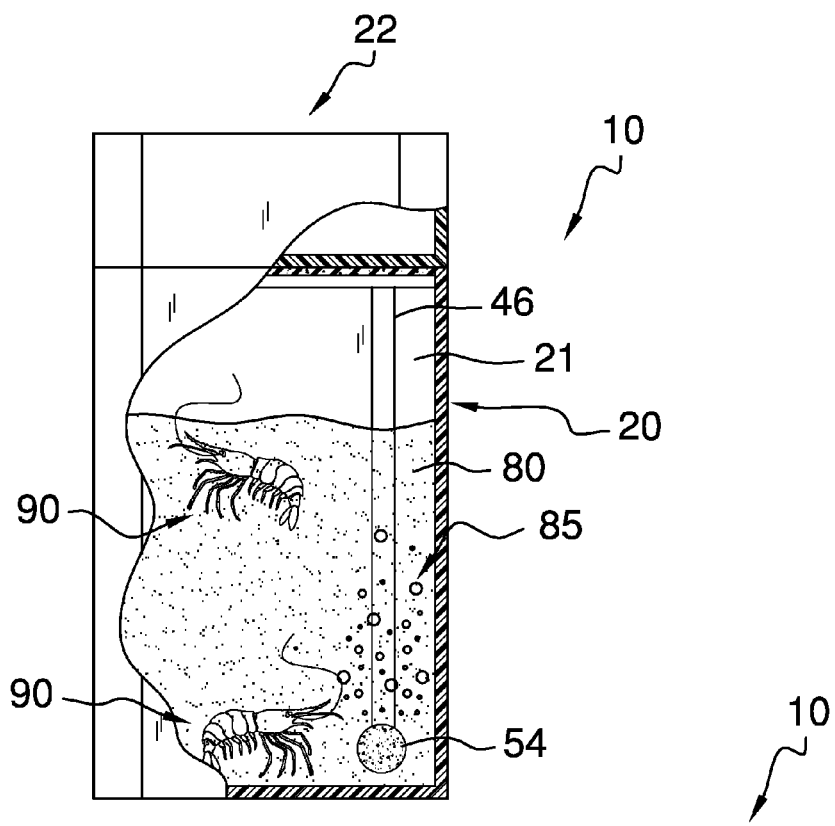
FIG. 5 is an outer partial cross sectional view.

Referring to FIG. 5, the hose 46 and the porous air stone 54 provide aeration in the form of fine air bubbles 85 to the water 80 within the well 21. The porous air stone 54 is disposed proximal to the bottom of the well 21, thereby providing effective aeration to the entirety of the water 80. Live bait 90 is thereby kept healthy and vibrant for extended time periods.

With respect to the above description then, it is to be realized that the optimum dimensional relationships for the parts of the bait well apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the bait well apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the bait well apparatus may be used.

Therefore, the foregoing is considered as illustrative only of the principles of the bait well apparatus. Further, since numerous modifications and changes will readily occur to those skilled in the art, it is not desired to limit the bait well apparatus to the exact construction and operation shown and described, and accordingly, all suitable modifications and equivalents may be resorted to, falling within the scope of the bait well apparatus.

What is claimed is:

1. A live bait well apparatus, comprising:
   a body hingedly affixed to a lid via a hinge, the body and lid having a concave inner surface spaced apart from a flat outer surface, the hinge disposed on the flat outer surface, a pair of spaced apart sides comprising a first side spaced apart from a second side, the sides perpendicular to the flat outer surface, a pair of spaced apart outer angles joining the flat outer surface to the pair of sides, the outer angles comprising a first outer angle and a second outer angle, a pair of spaced apart inner angles comprising a first inner angle and a second inner angle, the inner angles joining the sides to the concave inner surface;
   a pair of spaced apart clips affixed to the body concave inner surface, the clips comprising a first clip and a second clip, the clips selectively disposed over a clothing item;
   a well within the body;
   a vent within a lid top;
   a removable lid bottom;
   a gasket sealing the lid bottom to the lid, the gasket further selectively sealing the lid to the body;
   an electric motor within the lid;
   a pump joined to the electric motor, the pump in communication with the vent;
   a battery power source within the lid, in communication with the pump;
   a flexible hose extended from the pump out of the lid bottom and into the well;
   a seal sealing the flexible hose within the lid bottom;
   a porous air stone affixed to a lower end of the flexible hose, the hose and the porous air stone providing aeration of the well.

2. The apparatus according to claim 1 wherein the well further comprises a capacity of up to 48 ounces.

3. The apparatus according to claim 1 wherein the well further comprises a capacity of up to 64 ounces.

4. A live bait well apparatus, comprising:
   a body hingedly affixed to a lid via a hinge, the body and lid having a concave inner surface spaced apart from a flat outer surface, the hinge disposed on the flat outer surface, a pair of spaced apart sides comprising a first side spaced apart from a second side, the sides perpendicular to the flat outer surface, a pair of spaced apart outer angles joining the flat outer surface to the pair of sides, the outer angles comprising a first outer angle and a second outer angle, a pair of spaced apart inner angles comprising a first inner angle and a second inner angle, the inner angles joining the sides to the concave inner surface;
   a pair of spaced apart clips affixed to the body inner surface, the clips comprising the first clip and the second clip, the clips selectively disposed over a belt;
   a window disposed within at least one of the body inner angles;
   a fill line disposed on each window;
   a well within the body;
   a vent within a lid top;
   a removable lid bottom;
   a gasket sealing the lid bottom to the lid, the gasket further selectively sealing the lid to the body;
   an electric motor within the lid;
   a pump joined to the electric motor, the pump in communication with the vent;
   a battery power source within the lid, in communication with the pump;
   a flexible hose extended from the pump out of the lid bottom and into the well;
   a seal sealing the flexible hose within the lid bottom;
   a porous air stone affixed to a lower end of the flexible hose, the flexible hose and the porous air stone providing aeration of the well.

5. The apparatus according to claim 4 wherein the well further comprises a capacity of up to 48 ounces.

6. The apparatus according to claim 4 wherein the well further comprises a capacity of up to 64 ounces.

* * * * *